(12) United States Patent
Draese et al.

(10) Patent No.: US 10,747,627 B2
(45) Date of Patent: *Aug. 18, 2020

(54) METHOD AND TECHNIQUE OF ACHIEVING EXTRAORDINARILY HIGH INSERT THROUGHPUT

(71) Applicant: International Business Machines Corporation, Armonk, NY (US)

(72) Inventors: Oliver Draese, San Jose, CA (US); Robert W. Lyle, Morgan Hill, CA (US); Kalpana Shyam, Los Altos, CA (US); George F. Wang, San Jose, CA (US); Julie A. Watts, Morgan Hill, CA (US); Shirley Zhou, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 282 days.

This patent is subject to a terminal disclaimer.

(21) Appl. No.: 15/866,329

(22) Filed: Jan. 9, 2018

(65) Prior Publication Data

US 2018/0129677 A1     May 10, 2018

Related U.S. Application Data

(63) Continuation of application No. 15/294,744, filed on Oct. 16, 2016.

(51) Int. Cl.
   *G06F 16/22*       (2019.01)
   *G06F 11/14*       (2006.01)

(52) U.S. Cl.
   CPC .......... *G06F 11/1474* (2013.01); *G06F 16/22* (2019.01); *G06F 2201/80* (2013.01)

(58) Field of Classification Search
   None
   See application file for complete search history.

(56) References Cited

U.S. PATENT DOCUMENTS

6,266,719 B1    7/2001  Rasmussen et al.
8,244,686 B2    8/2012  Deshmukh et al.
(Continued)

OTHER PUBLICATIONS

Anonymous, "Method for a protocol with high throughput between two processor sections while meeting in-order restrictions"; IPCOM000133380D; Jan. 25, 2006.

(Continued)

*Primary Examiner* — Giuseppi Giuliani
(74) *Attorney, Agent, or Firm* — North Shore Patents, P.C.; Joseph L. Acayan (57) ABSTRACT

In a high insert throughput in a database system, the database management system (DBMS) caches, asynchronously from data insert transactions, a list of storage location identifiers for storage locations in a table space in the database system. When a request for an insert transaction with an insert size is received from an agent, the DBMS identifies a storage location on the list with an amount of free space meeting the insert size. The DBMS removes the storage location identifier from the list and returns the storage location identifier for the storage location. When the insert transaction completes, the DBMS determines a remaining free space at the storage location and adds the storage location identifier to the list according to the remaining free space. By removing storage location identifiers from the list, another agent cannot receive the same storage location identifier for a parallel task. Thus, space contention is avoided.

9 Claims, 5 Drawing Sheets

(56) References Cited

U.S. PATENT DOCUMENTS

| | | |
|---|---|---|
| 9,002,802 B2 | 4/2015 | Deshmukh et al. |
| 2009/0271435 A1 | 10/2009 | Yako et al. |
| 2014/0279849 A1 | 9/2014 | Zhang et al. |
| 2015/0089134 A1 | 3/2015 | Mukherjee et al. |

OTHER PUBLICATIONS

Anonymous, "Method for Achieving Optimum Throughput When Using ReducedLatency DRAM as a Packet Buffer"; IPCOM000142959D; Nov. 9, 2006.
List of IBM Patents or Patent Applications Treated as Related.
Margaritis, G., "Efficient Range-Based Storage Management for Scalable Datastores", IEEE Transactions on Parallel and Distributed Systems, vol. 25, No. 11; Nov. 2014,.

FIG. 5

METHOD AND TECHNIQUE OF ACHIEVING EXTRAORDINARILY HIGH INSERT THROUGHPUT

BACKGROUND

In many database systems, workloads doing multiple data inserts via parallel tasks can run into contention while looking for space, resulting in deteriorating performance. Typically, this involves insert transactions interrogating shared control information that provides an indication as to where there is space to accommodate insertions, with the control information being updated during the course of insertion to reflect the consumption of space. One drawback to this approach is that parallel tasks see the same control information and race for the same space, with one task winning the race and modifying the control information, and the rest of the tasks racing for other available space, yet again based on commonly viewed control information. Other drawbacks, include contention during updates of the control information.

SUMMARY

Disclosed herein is a method for high insert throughput and a computer program product as specified in the independent claims. Embodiments of the present invention are given in the dependent claims. Embodiments of the present invention can be freely combined with each other if they are not mutually exclusive.

According to an embodiment of the present invention, in a high insert throughput in a database system, the database management system (DBMS) caches, asynchronously from data insert transactions, a list of storage location identifiers for storage locations in the database system. When a request for an insert transaction with an insert size is received from an agent, the DBMS identifies a storage location on the list with an amount of free space meeting the insert size. The DBMS returns the storage location identifier for the storage location and removes the storage location identifier from the list. When the insert transaction completes, the DBMS determines a remaining free space at the storage location and adds the storage location identifier to the list according to the remaining free space. By removing storage location identifiers from the list, another agent cannot receive the same storage location identifier for a parallel task. Thus, storage location contention is avoided.

DETAILED DESCRIPTION

Figure 1:
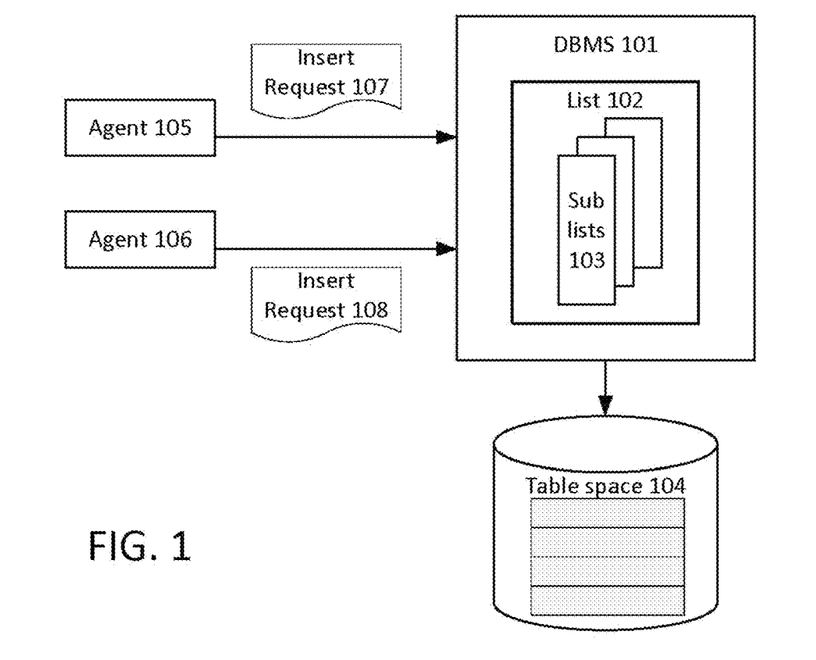
FIG. 1 illustrates a database system for high insert throughput according to embodiments of the present invention.

FIG. 1 illustrates a database system for high insert throughput according to embodiments of the present invention. The database system includes a database management system (DBMS) 101 that maintains a list 102 of storage location identifiers for free space in the table space 104. For example, when the table space 104 is organized as "pages", the smallest unit of I/O that the database system can handle, the list 102 contains page numbers as storage location identifiers. Agents 105-106 perform tasks for a workload in parallel and submit parallel insert requests 107-108 to the DBMS 101. The DBMS 101 returns a storage location from the list 102 as described further below.

Figure 2:
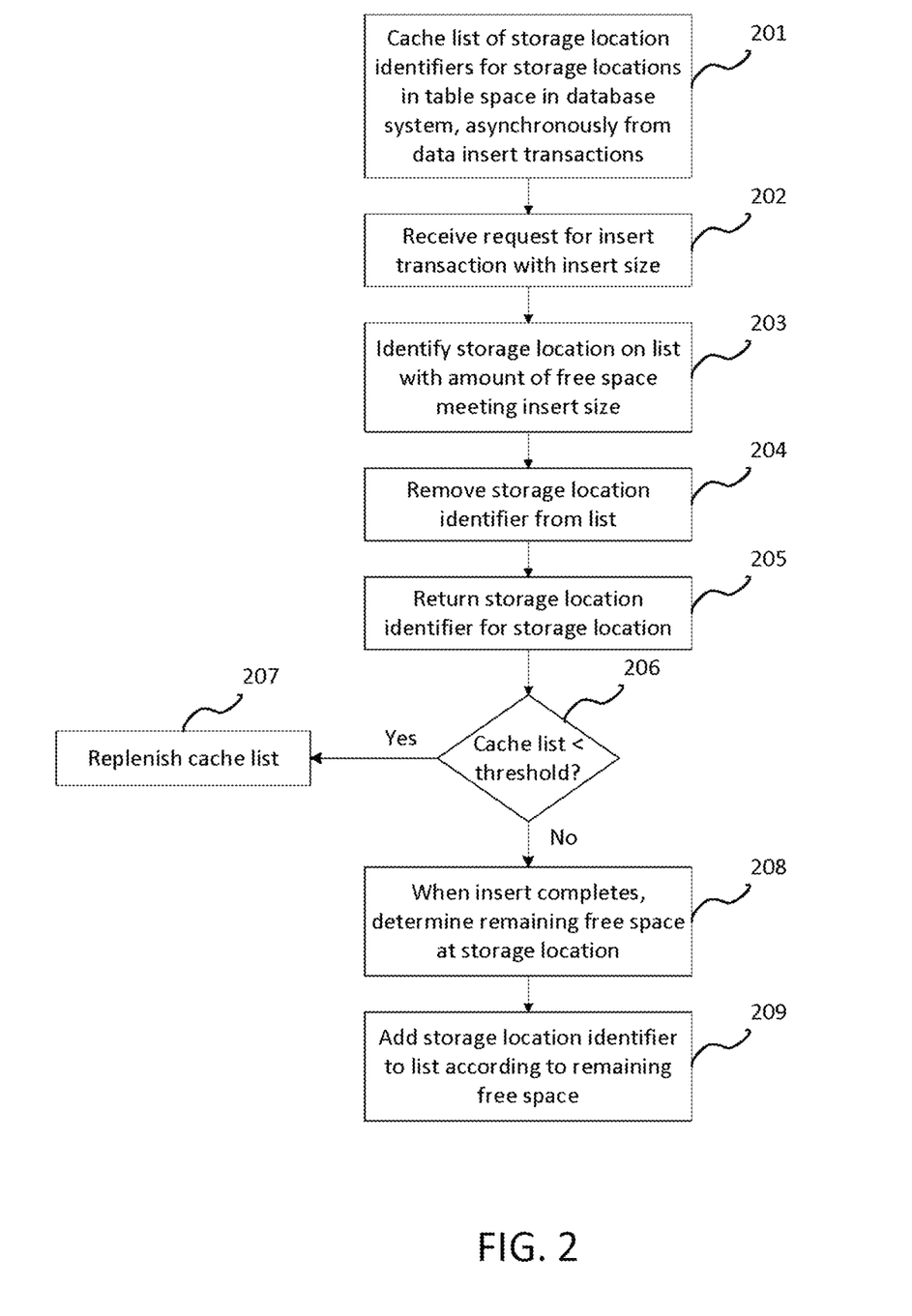
FIG. 2 is a flowchart illustrating a method for high insert throughput according to embodiments of the present invention.

FIG. 2 is a flowchart illustrating a method for high insert throughput according to embodiments of the present invention. The DBMS caches the list 102 of storage location identifiers in the database system asynchronously from data insert transactions (201). In one exemplary embodiment, free space in the table space 104 (e.g. the pages) are batch pre-formatted, and their identifiers stored in the list 102 as a "pipe" data structure. For example, the batch pre-formatting task may be triggered by a first insert transaction. The DBMS receives a request 107 from an agent 105 for an insert transaction with an insert size (202). The insert size is the size of the row to be inserted. In response to the request 107, the DBMS identifies a storage location on the list 102 with an amount of free space meeting the insert size (203). The storage location identifier is removed from the list 102 (204). Here, the storage location identifier may be "removed" by actual removal from the list 102 or by an indication that the storage location identifier is unavailable. The DBMS 101 returns the storage location identifier for this storage location (205), the storage location identifier is "checked out" by the agent 105. If multiple inserts are required, the insert transaction may maintain ownership of the storage location until all inserts are complete or until there is no longer sufficient free space at the storage location. In this embodiment, when the storage locations on the list 102 diminishes and falls below a preconfigured threshold (206), the list 102 may be replenished asynchronously to data insert transactions (207), as explained further below. When the insert transaction(s) completes, the DBMS 101 determines the remaining free space left at the storage location (208). The DBMS 101 then adds, i.e., "checks in", the storage location identifier back to the list 102 according to the free space remaining (209).

When the DBMS receives a separate (second) request 108 from the agent 106 for another (second) insert transaction, in parallel with the insert request 107 (202), the DBMS 101 identifies another (second) storage location on the list 102 with an amount of free space meeting the insert size for the second insert transaction (203). The second storage location identifier is removed from the list 102 (204). The DBMS 101 returns a second storage location identifier for the second storage location, different from the first storage location (205). If multiple inserts are required, the second insert transaction may maintain ownership of the second storage location until all inserts are complete or until there is no longer sufficient free space at the second storage location. In this embodiment, when the storage locations on the list 102 diminishes and falls below a preconfigured threshold (206), the list 102 may be replenished asynchronously to data insert transactions (207), as explained further below. When the insert transaction(s) completes, the DBMS 101 determines the remaining free space left at the second storage location (208). The DMBS 101 then adds the second storage location identifier back to the list 102 according to the free space remaining (209).

By removing storage location identifiers from the list when the storage location identifiers are to be sent to an agent, another agent cannot receive the same storage location identifier for a parallel task. The storage location identifier is not added back to the list 102 until the insert completes. Thus, control information contention is avoided.

Figure 3A:
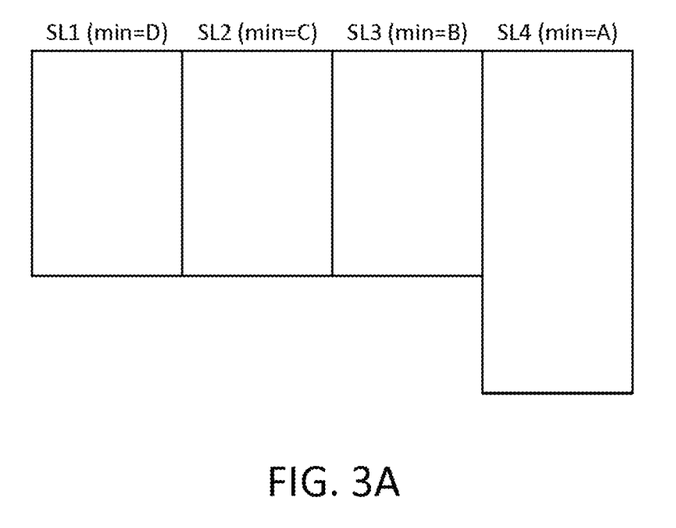
FIG. 3A illustrates example sublists for inserted data to be added to the end of the table space, according to embodiments of the present invention.

In one exemplary embodiment, the list 102 comprises a plurality of sublists 103. Each sublist is associated with a minimal amount of free space. Each sublist stores storage location identifiers for storage locations with at least the associated minimum amount of free space. FIG. 3A illustrates an example of sublists according to embodiments of the present invention. In this example, assume there are four sublists in the list 102, SL1, SL2, SL3, and SL4. SL1-SL4 may be associated with minimum amounts of free space, D, C, B, and A, respectively, where D<C<B<A. When a storage location is initially formatted to have at least A free space, its identifier is stored in SL4. As a storage location is "checked out" for insert transactions, the remaining space at the storage location is reduced. Depending on the amount of remaining space, the storage location identifier would be added to the sublist associated with the largest minimum free space that is less than or equal to the remaining space. For example, if the remaining free space X is between A and B, i.e., B<X<A, then the storage location identifier is "checked in" on SL3. Assume another request is received for an insert transaction with Y insert size, where B<Y<A. The DBMS 101 would then return a storage location from sublist SL3. In this manner, the efficiency in finding a storage location with enough free space of the insert transaction is further improved.

Figure 4:
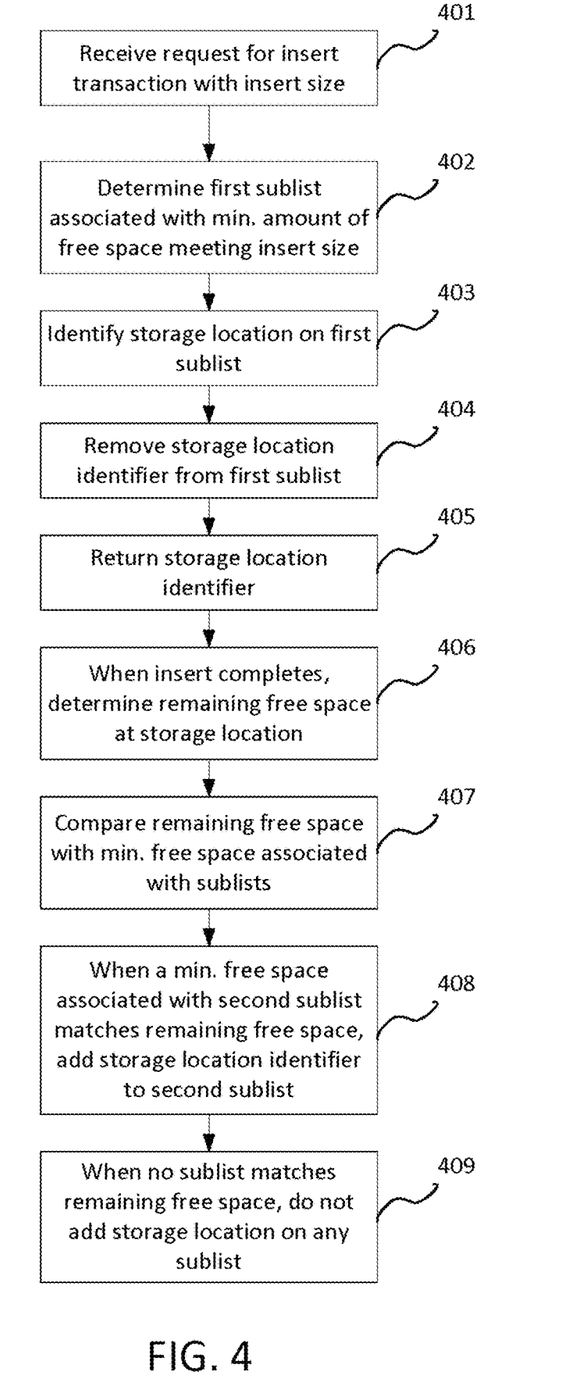
FIG. 4 is a flowchart illustrating a method for high insert throughput using sublists according to embodiments of the present invention.

FIG. 4 is a flowchart illustrating a method for high insert throughput using sublists according to embodiments of the present invention. When the DBMS 101 receives a request for an insert transaction with an insert size (401), the DBMS 101 determines a first sublist associated with a minimum amount of free space that meets the insert size (402), i.e., a minimum amount of free space insert size. The DBMS 101 identifies a storage location on the first sublist (403), removes the storage location identifier form the first sublist (404), and returns the storage location identifier (405). When the insert transaction(s) completes, the DBMS 101 determines the amount of remaining free space at the storage location (406) and compares the remaining free space with the minimum free space associated with the sublists (407). When a minimum free space associated with a second sublist matches the remaining free space, the DBMS 101 adds the storage location identifier to the second sublist (408). Here, the minimum free space that "matches" the remaining free space is the largest minimum free space of the sublists that is less than or equal to the remaining space. In the example sublists illustrated in FIG. 3A, the second sublist may be SL1, SL2, or SL3, as SL4 is reserved for newly formatted and unused storage locations. When no sublist matches the remaining free space, i.e., the remaining free space is less than all minimum amounts of free space, the storage location identifier is not added back to any sublist (409). In this illustrative embodiment, the control information is not updated after each insert transaction, as conventionally done. Instead, the control information update is deferred until the free space at the storage location is added back to a sublist. In this manner, the frequency of control information updates is reduced, further improving performance.

Figure 3B:
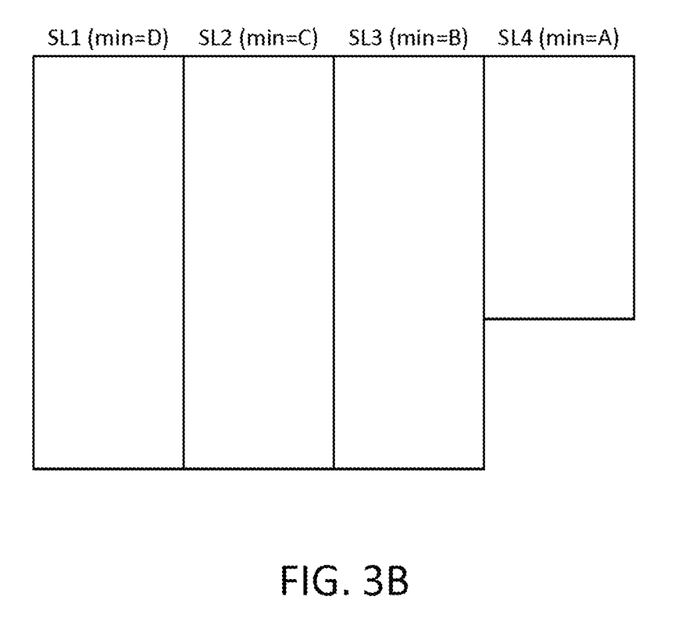
FIG. 3B illustrates example sublists for inserted data to be added in available locations from the beginning of the table space, according to embodiments of the present invention.

In one exemplary embodiment, as the storage locations on the list 102 diminishes and falls below a preconfigured threshold, the batch pre-formatting task may be triggered to asynchronously format additional storage locations to refill the list 102, adding the identifiers for the additional storage locations to the appropriate sublist 103. For example, returning to FIG. 3A, when the additional storage locations are appended to the existing table space 104, the additional identifiers are added to sublist SL4, associated with newly formatted storage locations. SL4 thus would be larger than the other sublists, SL1-SL3. However, additional storage locations may be collected or reclaimed by scanning the table space 104 for space made available by transactions such as data deletions. These additional storage locations may vary in size and less likely to match the minimum free space of SL4. Thus, as illustrated in FIG. 3B, the size of the other sublists, SL1-SL3, may be larger than SL4.

Figure 5:
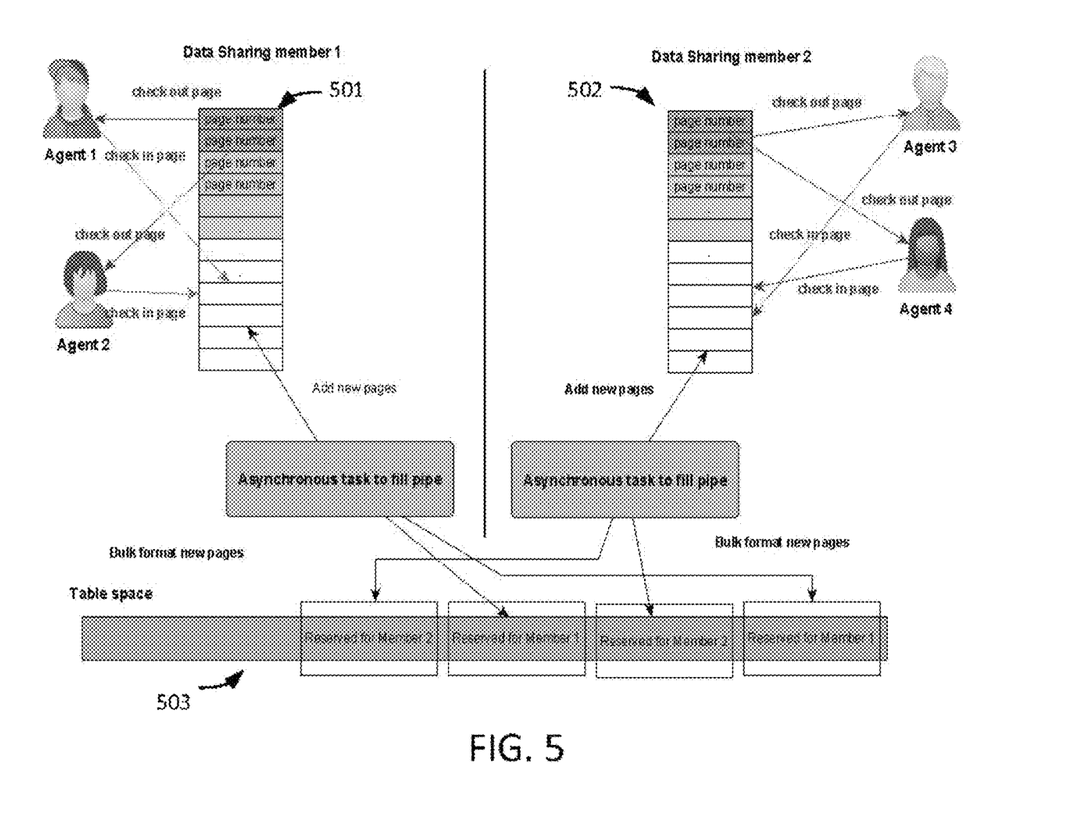
FIG. 5 illustrates the maintenance of separate lists for different data sharing group members according to embodiments of the present invention.

In one exemplary embodiment, separate lists are maintained for different members of a data sharing groups. FIG. 5 illustrates the maintenance of separate lists for different data sharing group members according to embodiments of the present invention. Assume that Agents 1 and 2 are part of Data Sharing Member 1, and Agents 3 and 4 are part of Data Sharing Member 2. Certain portions 503 of the table space are reserved for Members 1 and 2, as illustrated. In this embodiment, the space reserved for the data sharing group members is transient, i.e., not permanent. The storage location identifiers for the reserved table spaces are stored on corresponding lists 501 and 502 maintained for Members 1 and 2. When Agent 1 sends a request for an insert, the DBMS 101 identifies a storage location from the list 501 maintained for Member 1, and this storage location identifier is then removed from the list 501. When Agent 2 sends a request for an insert in parallel with the request from Agent 1, Agent 2 receives a storage location identifier from the list 501 different from the identifier sent to Agent 1, as described above with referenced to FIG. 2. Similarly, when Agent 3 sends a request for an insert, the DBMS 101 identifies a storage location from the list 502 maintained for Member 2, and this storage location identifier is then removed from the list 502. When Agent 4 sends a request for an insert in parallel with the request from Agent 3, Agent 4 receives a storage location identifier from the list 502 different from the identifier sent to Agent 3. Further, since separate lists 501-502 are maintained for Members 1 and 2, Agents 1-4 would receive different storage location identifiers for parallel insert requests. In this manner, control information contention is avoided among different data sharing members and within a data sharing member. As the lists 102 diminishes, they can each be refilled via an asynchronous pre-formatting task, as described above. Sublists may also be used with the lists 501-502, as described above.

Embodiments for high insert throughput have been described. The embodiments of the present invention improve the performance of space searches by reducing space contentions, reducing control information contention, batch pre-formatting storage locations asynchronously with the insert transactions, and updating the control information less frequently.

Figure 6:
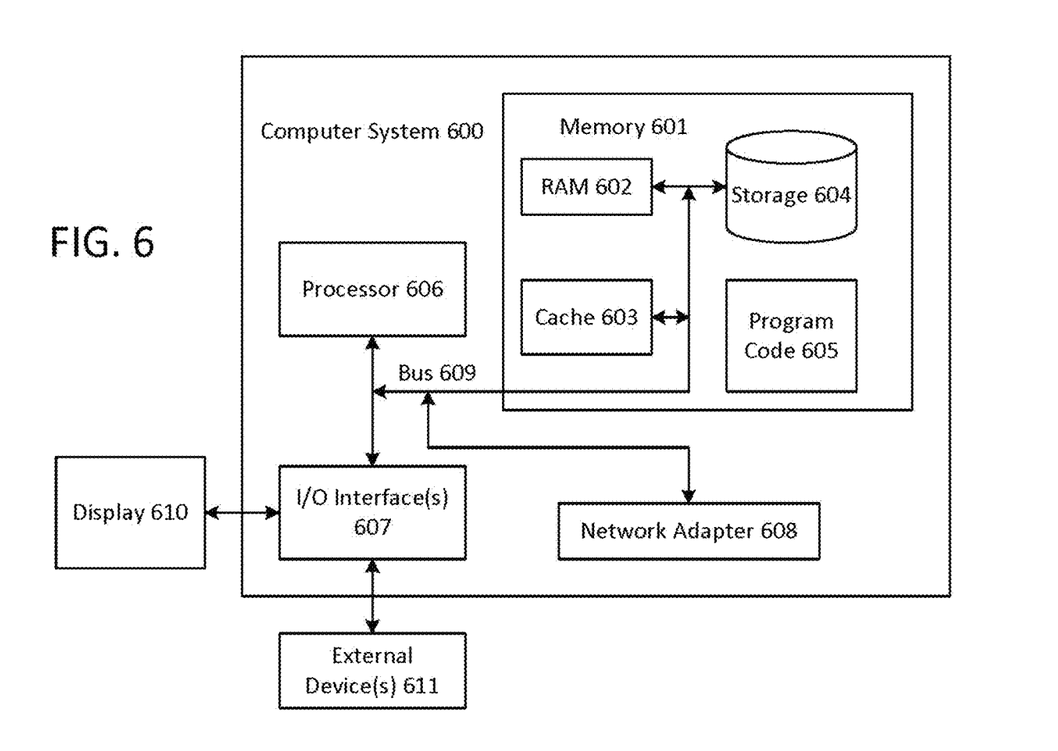
FIG. 6 illustrates a computer system according to embodiments of the present invention.

The embodiments of the present invention may be implemented by a computer system, as illustrated in FIG. 6. The computer system 600 is operationally coupled to a processor or processing units 606, a memory 601, and a bus 609 that couples various system components, including the memory 601 to the processor 606. The bus 609 represents one or more of any of several types of bus structure, including a memory bus or memory controller, a peripheral bus, an accelerated graphics port, and a processor or local bus using any of a variety of bus architectures. The memory 601 may include computer readable media in the form of volatile memory, such as random access memory (RAM) 602 or cache memory 603, or non-volatile storage media 604. The memory 601 may include at least one program product having a set of at least one program code module 605 that are configured to carry out the functions of embodiment of the present invention when executed by the processor 606. The computer system 600 may also communicate with one or more external devices 611, such as a display 610, via 110 interfaces 607. The computer system 100 may communicate with one or more networks via network adapter 608.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for insert throughput in a database system, comprising:
    caching, asynchronously from data insert transactions, a list of storage location identifiers for a plurality of storage locations in a table space in the database system, wherein the list comprises a plurality of sublists, and wherein each sublist is associated with a respective minimum amount free space;
    receiving, by the database management system, a request for an insert transaction with an insert size;
    determining a first sublist of the plurality of sublists, wherein the first sublist is associated with a first minimum amount of free space meeting the insert size, and wherein the first sublist stores storage location identifiers for storage locations with at least the first minimum amount of free space meeting the insert size;
    identifying, by the database management system, a storage location on the first sublist with an amount of free space meeting the insert size;
    removing the storage location identifier from the first sublist by the database management system;
    returning the storage location identifier for the storage location in response to the request by the database management system;
    when the insert transaction completes, determining a remaining free space at the storage location; and
    adding the storage location identifier to a second sublist according to the remaining free space.

2. The method of claim 1, wherein the second sublist is associated with a largest minimum free space that is less than or equal to the remaining space.

3. The method of claim 2, further comprising:
    receiving, in parallel with the request by the database management system, a second request for a second insert transaction with a second insert size;
    identifying, by the database management system, a second storage location on the list with a second amount of free space meeting the second insert size;
    returning the second storage location identifier, different from the storage location identifier, for the second storage location by the database management system;
    removing the second storage location identifier from the list by the database management system;
    when the second insert transaction completes, determining a second remaining free space at the second storage location by the database management system; and
    adding, by the database management system, the second storage location identifier to the list according to the second remaining free space.

4. The method of claim 1, further comprising:
    comparing the remaining free space with the minimum amount of free spaces associated with the plurality of sublists; and
    when a second minimum amount of free space associated with a second sublist matches the remaining free space, adding the storage location identifier to the second sublist, wherein the second minimum amount of free space that matches the remaining free space is a largest minimum amount of free space of the plurality of sublists that is less than or equal to the remaining space.

5. The method of claim 1, further comprising:
    when the remaining free space does not match any of the minimum amount of free spaces associated with the plurality of sublists, do not add the storage location identifier to any of the plurality of sublists.

6. The method of claim 5, further comprising:
    when the storage location identifier is not added to any of the plurality of sublists, updating control information for the table space comprising the storage location on the list.

7. The method of claim 1, wherein the database system comprises a plurality of data sharing group members, wherein portions of the table space are reserved for each corresponding member of the plurality of data sharing groups, wherein a separate list of storage location identifiers are maintained for each corresponding member, wherein the storage location identifiers for the portions of the table space reserved, for each corresponding member is stored in the list corresponding to the member.

8. The method of claim 7, where the portions of the table space are transiently reserved for each corresponding member of the plurality of data sharing groups.

9. The method of claim 1, further comprising:
    determining space cached on the list is below a preconfigured threshold; and
    in response, batch formatting additional storage locations and adding storage location identifiers for the additional storage locations to the list.

* * * * *